(12) United States Patent
Evans et al.

(10) Patent No.: US 8,185,280 B2
(45) Date of Patent: May 22, 2012

(54) METHOD AND APPARATUS FOR SHIFTING GEARS IN TRANSMISSIONS

(75) Inventors: Michael Evans, Coventry (GB); Simon Conway, Royal Leamington Spa (GB)

(73) Assignee: Caterpillar Inc., Peoria, IL (US)

( * ) Notice: Subject to any disclaimer, the term of this patent is extended or adjusted under 35 U.S.C. 154(b) by 1167 days.

(21) Appl. No.: 12/003,004

(22) Filed: Dec. 19, 2007

(65) Prior Publication Data
US 2008/0154467 A1   Jun. 26, 2008

(30) Foreign Application Priority Data
Dec. 21, 2006   (EP) ..................................... 06256510

(51) Int. Cl.
*G06F 17/00* (2006.01)
(52) U.S. Cl. ......................................................... 701/52
(58) Field of Classification Search .................... 701/51, 701/52, 54, 61, 62, 64; 477/124, 125, 127, 477/144, 148
See application file for complete search history.

(56) References Cited

U.S. PATENT DOCUMENTS

| | | | |
|---|---|---|---|
| 3,095,757 A | | 7/1963 | Thoma |
| 4,947,687 A | * | 8/1990 | Martini et al. ............... 74/733.1 |
| 5,823,072 A | * | 10/1998 | Legner .......................... 74/733.1 |
| 6,202,016 B1 | * | 3/2001 | Stephenson et al. ............ 701/51 |
| 2001/0041645 A1 | * | 11/2001 | Nanri et al. ...................... 477/68 |
| 2006/0155448 A1 | | 7/2006 | Shah |

FOREIGN PATENT DOCUMENTS

| | | |
|---|---|---|
| DE | 457 880 | 3/1928 |
| DE | 44 31 864 | 3/1996 |
| EP | 0 282 010 | 9/1988 |
| EP | 0 752 545 | 1/1997 |
| EP | 1 076 194 | 2/2001 |
| EP | 1 277 991 | 1/2003 |
| FR | 2 599 106 | 11/1987 |

OTHER PUBLICATIONS

European Search Report dated May 22, 2007, for Application No. 06256510 (2 pages).

* cited by examiner

*Primary Examiner* — Isam Alsomiri

(57) ABSTRACT

A method of changing from a first gear position to a second gear position of a transmission arrangement is disclosed. The arrangement includes a rotatable transmission member, a hydrostatic continuously variable transmission coupled to the transmission member and operable to rotate the transmission member at a first speed, a controller configured to control operation of the hydrostatic continuously variable transmission, and a gear apparatus coupled to the transmission member and configured to be shiftable between at least the first gear position and the second gear position. The method includes controlling the hydrostatic continuously variable transmission, using the controller, to rotate the transmission member at the first speed, and shifting the gear apparatus from the first gear position to the second gear position while the transmission member is rotating at, or converging with, the first speed.

19 Claims, 2 Drawing Sheets

METHOD AND APPARATUS FOR SHIFTING GEARS IN TRANSMISSIONS

TECHNICAL FIELD

The present disclosure relates to transmissions, and more particularly, to a method and apparatus for shifting gears in transmissions.

BACKGROUND

Many machines and off-road vehicles include unsynchronized mechanical transmissions, often in addition to a hydraulic transmission such as a hydrostatic continuously variable transmission (CVT). Machines and vehicles with such a hydro-mechanical transmission have the benefits of infinite gear ratios and high torque when using the hydrostatic transmission at low vehicle speeds, while at higher speeds the mechanical transmission is generally more efficient.

There are a number of reasons for using an unsynchronized mechanical transmission. For example, synchronizers are expensive and can wear out too easily. However, the omission of synchronizers can lead to difficulties when shifting gear, for example when the machine or vehicle is stationary and a large load is present on the mechanical gearing. In such case, the transmission selecting member may not be able to easily disengage the existing gear when attempting to shift to a neutral gear position. Furthermore, when attempting to shift from the neutral gear position to select one of the gears, the transmission selecting member and the gear may not be properly aligned such that shifting to that gear is not possible.

The conventional solution for such transmission arrangements is for the operator to slowly drive the machine or vehicle in the relevant direction using the hydrostatic CVT until the load on the mechanical gearing is removed, thus allowing the desired gear to be selected. However, this requires skill from the operator and it is possible for the transmission to become stuck between gears. Also, such an approach can cause damage to the transmission.

SUMMARY

According to a first aspect of the present disclosure, there is provided a method of changing from a first gear position to a second gear position of a transmission arrangement. The transmission arrangement includes a rotatable transmission member, a hydrostatic continuously variable transmission coupled to the transmission member and operable to rotate the transmission member at a first speed, a controller configured to control operation of the hydrostatic continuously variable transmission, and a gear apparatus coupled to the transmission member and configured to be shiftable between at least the first gear position and the second gear position. The method includes controlling the hydrostatic continuously variable transmission, using the controller, to rotate the transmission member at the first speed. The method also includes shifting the gear apparatus from the first gear position to the second gear position while the transmission member is rotating at, or converging with, the first speed.

The hydrostatic continuously variable transmission may be operable to rotate the transmission member at an intermediate speed, and the method may include controlling the hydrostatic continuously variable transmission, using the controller, to rotate the transmission member at the intermediate speed, and then at the first speed.

It is to be understood that the intermediate speed may be higher, and in the same or in an opposite direction, to the first speed. The intermediate speed also may be lower, and in the same or in an opposite direction, to the first speed. The intermediate speed also may be equal, but in an opposite direction, to the first speed. Also, the term "speed" is intended to include a particular speed range, such that the transmission member rotates within an intermediate speed range, and then within a first speed range.

According to a second aspect of the present disclosure, there is provided a transmission arrangement having at least a first gear position and a second gear position. The transmission arrangement includes a transmission member, a gear apparatus coupled to the transmission member and configured to be shiftable between at least the first gear position and the second gear position, shifting structure operable to shift the gear apparatus between at least the first gear position and the second gear position, a hydrostatic continuously variable transmission capable of rotating the transmission member at a first speed, and a controller configured to control operation of the shifting structure and the hydrostatic continuously variable transmission. The controller is configured to operate the hydrostatic continuously variable transmission to cause rotation of the transmission member at the first speed. The controller also is configured to allow the shifting structure to shift the gear apparatus from the first gear position to the second gear position while the transmission member is rotating at, or converging with, the first speed.

According to a third aspect of the present disclosure, there is provided a vehicle having a transmission arrangement in accordance with the second aspect of the disclosure.

BRIEF DESCRIPTION OF THE DRAWINGS

An embodiment of the present disclosure will now be described, by way of example only, with reference to the accompanying drawings, in which.

DETAILED DESCRIPTION

Figure 1:
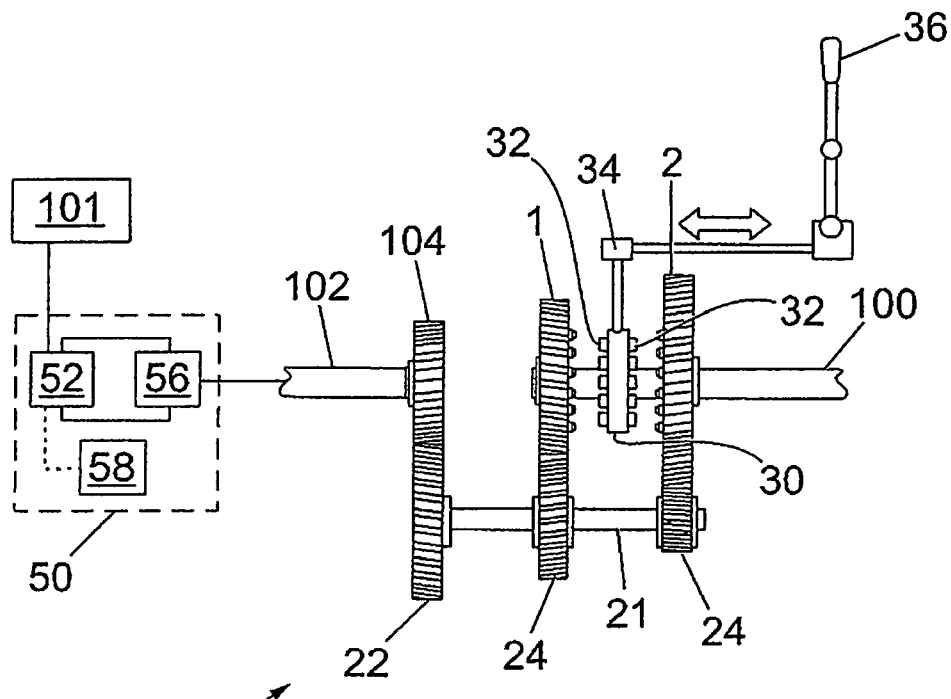
FIG. 1 is a diagrammatic view of a first embodiment of a transmission arrangement.

FIG. 1 diagrammatically illustrates a first embodiment of a transmission arrangement 10 which may include a hydrostatic CVT 50 and a mechanical transmission 20. In the embodiment of FIG. 1, the hydrostatic CVT 50 and mechanical transmission 20, as well as the engine 101, are arranged in series.

The hydrostatic CVT 50 may include a variable displacement pump 52 actuated by the engine 101. The pump 52 may pump fluid around a hydraulic circuit 54 which may cause rotation of a hydrostatic motor 56. Where the pump 52 has variable displacement, the fluid can be pumped at various speeds and in either direction around the circuit 54. Accordingly, the motor 56 can rotate at various speeds and in either a clockwise or a counter-clockwise direction.

The motor 56 may be coupled to a transmission member or CVT output shaft 102 which may be coupled to the mechanical transmission 20. The hydrostatic CVT 50 therefore may be capable of rotating the CVT output shaft 102. The CVT output shaft 102 can be rotated at an intermediate speed and at a first speed. This intermediate speed may be higher, and in the same or in an opposite direction, to the first speed. The intermediate speed also may be lower, and in the same or in an opposite direction, to the first speed. The intermediate speed also may be equal, but in an opposite direction, to the first speed. Therefore, the intermediate speed is intermediate in a chronological sense. A controller 58 may control the speed and direction of the pump 52.

The mechanical transmission 20 may include a lay-shaft 21 which may have a first lay-shaft gear 22 non-rotatably mounted on the lay-shaft 21, in the sense that the first lay-shaft gear 22 cannot rotate relative to the lay-shaft 21. The first lay-shaft gear 22 may be connected to a gear 104 which is non-rotatably mounted on the CVT output shaft 102. Two further lay-shaft gears 24 may be non-rotatably mounted on the lay-shaft 21 and may be connected to a respective forward gear 1 or 2. A reverse gear can be achieved hydraulically by simply pumping fluid around the hydraulic circuit 54 in the opposite direction.

The gears 1 and 2 may be rotatably mounted on a mechanical transmission output shaft 100. In the embodiment of FIG. 1, the mechanical transmission output, e.g., output shaft 100, may be connected to the diagrammatically illustrated vehicle wheels 106 via diagrammatically illustrated differential gearing 105, for example. It will be understood that, for purposes of this disclosure, the term "wheels" is intended to encompass both those ground engaging members generally characterized as wheels, and other ground engaging members, such as tracks. A collar 30 also may be mounted on the mechanical transmission output shaft 100, but in a non-rotatable and axially movable manner. The collar 30 may include protrusions 32 on each face of the collar 30 which may be engageable with one of the gears 1 and 2 when the collar 30 is moved axially towards the gear.

Shifting structure, for example in the form of a gear selecting member 34 may be provided. Gear selecting member 34 may be operable to axially move the collar 30 to achieve a shift from a first gear position, such as the neutral position shown in FIG. 1, to a second gear position. A shift lever 36 may be provided for controlling operation of the gear selecting member 34. The shift lever 36 and controller 58 may provide control structure configured to control the operation of the shifting structure, and the transmission arrangement 10 and drive structure, respectively.

Figure 2:
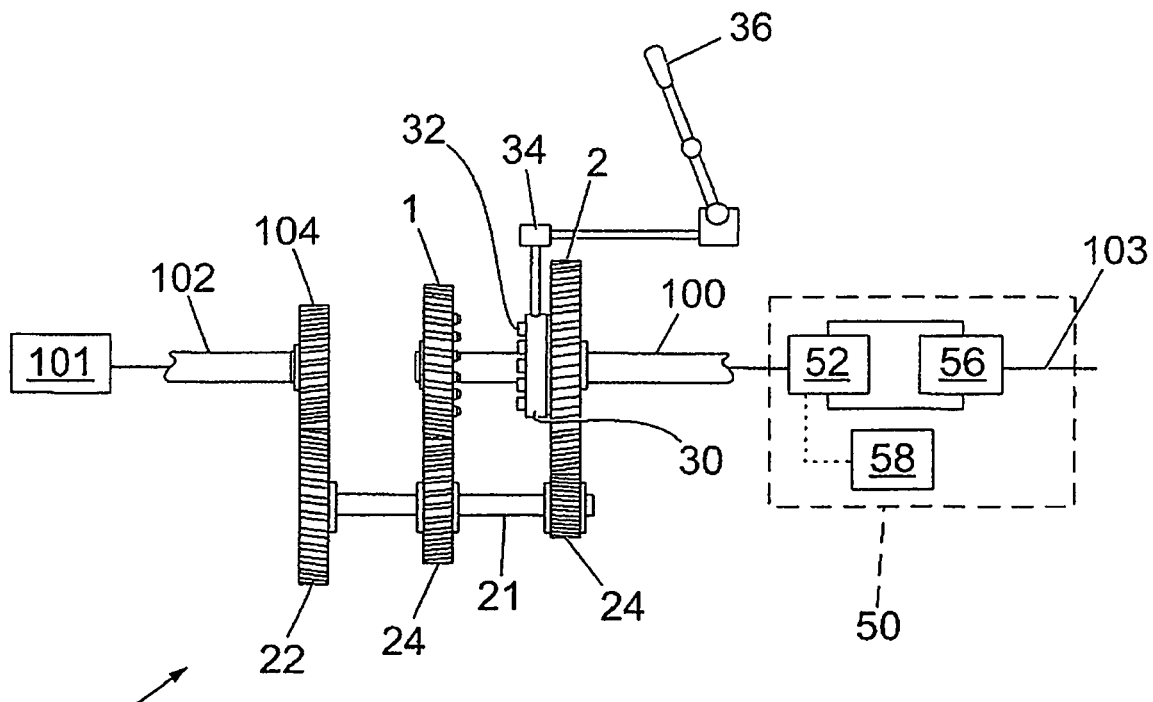
FIG. 2 is a diagrammatic view of a second embodiment of a transmission arrangement.

FIG. 2 diagrammatically illustrates a second embodiment of a transmission arrangement 10. In the embodiment of FIG. 2, the hydrostatic CVT 50 and mechanical transmission 20, as well as the engine 101, again may be arranged in series. The first lay-shaft gear 22 of the lay-shaft 21 of the mechanical transmission 20 may be connected to a gear 104 which is non-rotatably mounted on the engine output shaft 102. In a manner similar to the embodiment of FIG. 1, two further lay-shaft gears 24 may be non-rotatably mounted on the lay-shaft 21 and may be connected to a respective forward gear 1 or 2.

The gears 1 and 2 may be rotatably mounted on a mechanical transmission output shaft 100. In the embodiment of FIG. 2, the mechanical transmission output shaft 100 may be connected to the hydrostatic CVT 50. Again, a collar 30 may be provided on the mechanical transmission output shaft 100 for engaging with one of the gears 1 and 2 when the collar 30 is moved axially towards the gear. The gear selecting member 34 can axially move the collar 30 to achieve a shift from a first gear position to a second gear position, as shown, for example, in FIG. 2.

The variable displacement pump 52 of the hydrostatic CVT 50 may be coupled to the mechanical transmission output shaft 100. The motor 56 may be coupled to the CVT output shaft 102 which is coupled to the vehicle wheels via differential gearing (not shown in FIG. 2). The hydrostatic CVT 50 therefore may be capable of rotating the CVT output shaft 102 at an intermediate speed and at a first speed. A controller 58 may control the speed and direction of the pump 52.

Figure 3:
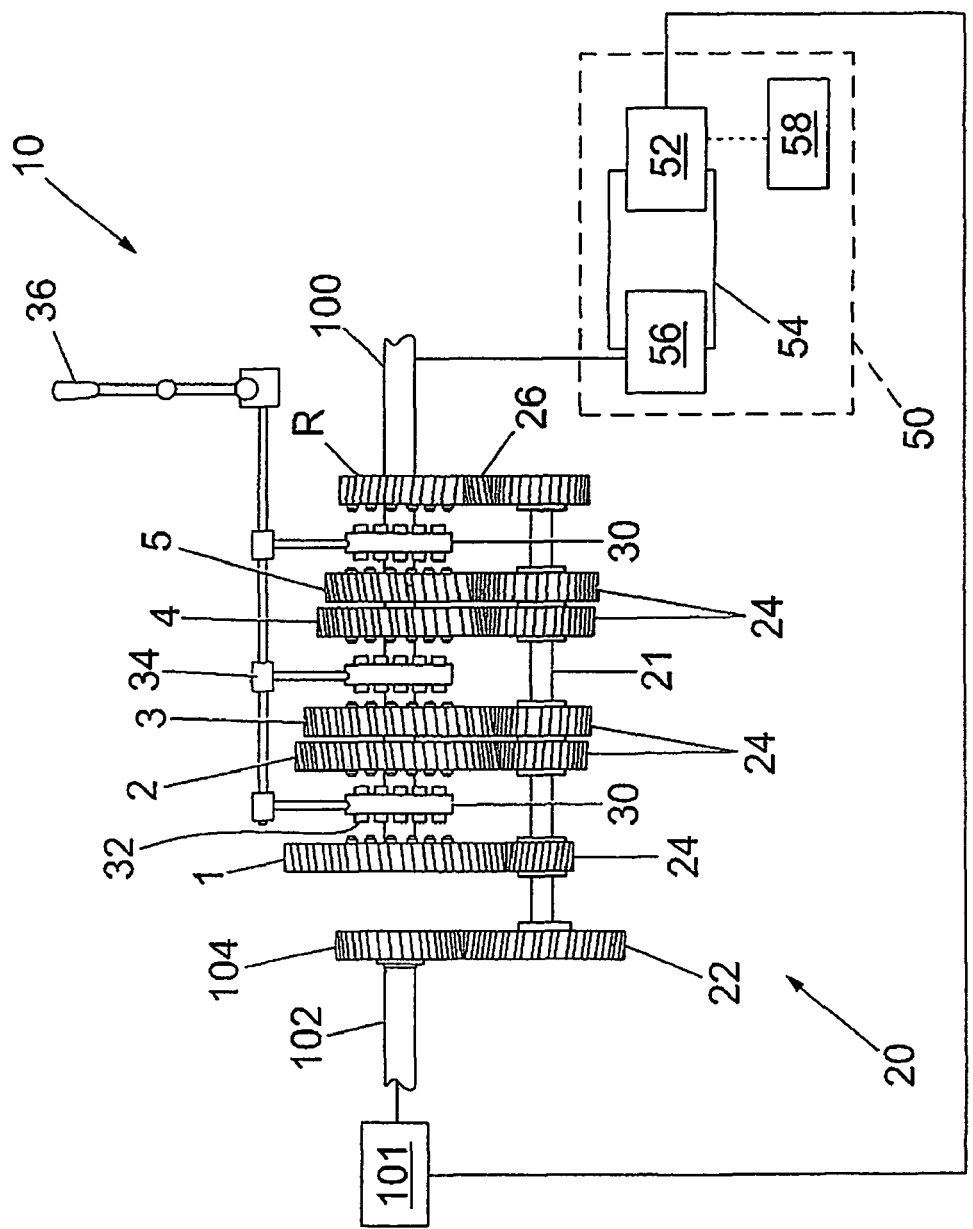
FIG. 3 is a diagrammatic view of a third embodiment of a transmission arrangement.

FIG. 3 diagrammatically illustrates a third embodiment of a transmission arrangement 10. In the embodiment of FIG. 3, the hydrostatic CVT 50 and mechanical transmission 20 are connected in parallel to the engine 101. The mechanical transmission 20 may include a lay-shaft 21 which, as in previously described embodiments, may have a first lay-shaft gear 22 non-rotatably mounted on the lay-shaft 21. The first lay-shaft gear 22 may be connected to an engine gear 104 which is non-rotatably mounted on an engine output shaft 102. Six further lay-shaft gears 24 all may be non-rotatably mounted on the lay-shaft 20 and mat be connected to a respective forward gear 1 to 5 or the reverse gear R. The reverse gear R may be connected via an idler gear 26.

The forward gears 1 to 5 and the reverse gear R may be rotatably mounted on the mechanical transmission output shaft 100. Three collars 30 also may be mounted on the output shaft 100. A gear selecting member 34 may be operable to axially move one of the collars 32 to achieve a shift from a first gear position, such as the neutral position shown in FIG. 3, to a second gear position 1 to 5 or R.

The pump 52 of the hydrostatic CVT 50 also may be coupled to the engine output shaft 102. The motor 56 may be coupled to the mechanical transmission output shaft 100. The hydrostatic CVT 50 therefore may be capable of rotating the mechanical transmission output shaft 100 at an intermediate speed and at a first speed. A controller 58 may control the speed and direction of the pump 52.

Industrial Applicability

Each of the disclosed transmission arrangements can be used to provide a method of changing from a first to a second gear position of the transmission arrangement. The initial conditions are that the engine is running but the clutch is engaged and so the engine output shaft and lay-shaft 21 are stationary. The transmission is at a first gear position, in which a collar 30 engages with the first gear 1 and so the lay-shaft 21 is connected to the mechanical transmission output shaft 100 via the first gear 1. A large load from the vehicle is present on the mechanical transmission output shaft 100 and this prevents the gear selecting member 34 from being able to axially move the collar 30 to separate from the first gear 1.

First, the controller 58 sends a first signal to the pump 52 to pump fluid within the circuit 54 in a particular direction, which causes rotation of the motor 56 in a particular direction. Depending on the embodiment concerned, this causes the CVT output shaft 102, 103 or the mechanical transmission output shaft 100 to accelerate and then rotate in a particular direction and at a particular intermediate speed. This particular direction of rotation of the shaft is arranged to be against the load that is present on the mechanical gearing. Acceleration of the shaft against the load produces a torque which causes the load to accelerate and then rotate at the intermediate speed.

The load on the mechanical gearing could correspond to either rotational direction of the shaft. For example, the vehicle may be on a slope with the front of the vehicle facing either up or down the slope. Therefore, the particular direction of rotation in which the shaft is accelerated may correspond to either a forwards or a reverse direction of the vehicle, providing that it is against the load on the mechanical gearing.

Very soon after this, the controller 58 sends a second signal to the pump 52 to pump fluid within the circuit 54 in the opposite direction. This causes the motor 56 to reverse direction, which causes the shaft to decelerate, then stop rotating, and then rotate in an opposite direction and at a first speed. At some point during deceleration and reversal of the shaft, the load acting on the shaft, which is still rotating at the intermediate speed, will decrease to a value which allows the gear selecting member 34 to separate the collar 30 from the first gear 1 such that the transmission in now in a neutral gear position.

It will be appreciated that separating the collar 30 from the first gear 1 is typically easier than engaging a new gear, even when large loads are present. Therefore, the previously described operation may be omitted and, instead, sufficient force may be applied by the gear selecting member 34 to separate the collar 30 from the first gear 1 such that the transmission is now in a neutral gear position.

Next, the controller 58 sends a third signal to the pump 52 to pump fluid within the circuit 54 in the original direction. This causes the motor 56 to again reverse direction, which causes the shaft to decelerate then stop rotating and then rotate in the original direction and at a second speed. This second speed is arranged to be suitable for allowing the gear selecting member 34 to be able to move the collar 30 to engage with a second gear 2.

The above disclosed method can be carried out to cause mere nudging of the shaft in alternate directions to reduce the load on the shaft, allowing a first gear to be disengaged and a second gear to be engaged. This is convenient for a vehicle operator, although longer time periods may be used. Repeated nudging in alternate directions can be carried out until the gear shift has been achieved.

For the above disclosed embodiments, the values of the intermediate, first and second speeds may not be particularly important since the use of alternating directions of rotation achieves the desired effect. Indeed, the speeds may be equal in magnitude and only differ in their direction.

In an alternative embodiment, an intermediate and first speed in the same direction may be used. The desired effect is achieved using an intermediate speed which is greater than the first speed. At some point when the shaft is decelerating from the intermediate speed to rotate at, or converge with, the first speed, the load acting on the shaft, which is rotating at the intermediate speed, will decrease to allow disengagement of the gear selecting member 34 and the current gear. In such case, the output shaft 100 may already be rotating in a direction which corresponds to a forwards direction of the vehicle, and so a third signal from the controller 58 may not be necessary.

The present disclosure provides a convenient method of shifting gears which is independent from the operator and reduces the possibility of the transmission becoming stuck between gears. Also, the disclosed method reduces the risk of damage to the transmission, thus prolonging the life of the transmission. It will be understood by those having ordinary skill in the art that the disclosed method and apparatus may be employed in connection with various types of vehicles and mobile machines. Also, it should be understood that, for purposes of this disclosure, use of the term "vehicle" is intended to encompass both those machines that may generally be characterized as vehicles, e.g., for transportation, and those mobile machines that may be employed in various industries, e.g., excavating, construction, and handling machines.

It will be apparent to those skilled in the art that various modifications and variations can be made to the disclosed method and apparatus without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method of changing from a first gear position to a second gear position of a transmission arrangement, the transmission arrangement including a rotatable transmission member, a hydrostatic continuously variable transmission coupled to the transmission member and operable to rotate the transmission member at a first speed, a controller configured to control operation of the hydrostatic continuously variable transmission, and a gear apparatus coupled to the transmission member and configured to be shiftable between at least the first gear position and the second gear position, the method comprising:
   controlling the hydrostatic continuously variable transmission, using the controller, to rotate the transmission member to cause nudging of the transmission member in a first direction, and then nudging of the transmission member in a second, opposite direction; and
   shifting the gear apparatus from the first gear position to the second gear position while the transmission member is rotating at, or converging with, the first speed.

2. The method of claim 1, wherein the hydrostatic continuously variable transmission is operable to rotate the transmission member at an intermediate speed, and wherein the method includes controlling the hydrostatic continuously variable transmission, using the controller, to rotate the transmission member at the intermediate speed, and then at the first speed.

3. The method of claim 2, wherein controlling the hydrostatic continuously variable transmission to rotate the transmission member at the intermediate speed, and then at the first speed, is repeated one or more times.

4. The method of claim 2, wherein the intermediate speed is lower and in the same direction as the first speed.

5. The method of claim 2, wherein the intermediate speed is higher and in the same direction as the first speed.

6. The method of claim 2, wherein the intermediate speed is in an opposite direction from the first speed.

7. The method of claim 1, wherein the transmission member includes an output shaft of a vehicle.

8. The method of claim 1, wherein the transmission arrangement is unsynchronized.

9. The method of claim 1, wherein the first gear position is the neutral gear position.

10. The method of claim 1, wherein the hydrostatic continuously variable transmission is operable to rotate the transmission member at an intermediate speed, and wherein the method includes controlling the hydrostatic continuously variable transmission, using the controller, to rotate the transmission member at the intermediate speed, and then at the first speed, wherein the transmission member includes an output shaft of a vehicle, and wherein the transmission arrangement is unsynchronized.

11. The method of claim 1, wherein the transmission arrangement is unsynchronized and the first gear position is the neutral gear position.

12. A transmission arrangement having at least a first gear position and a second gear position, the arrangement comprising:
   a transmission member;
   a gear apparatus coupled to the transmission member and configured to be shiftable between at least the first gear position and the second gear position;

shifting structure operable to shift the gear apparatus between at least the first gear position and the second gear position;

a hydrostatic continuously variable transmission capable of rotating the transmission member at a first speed; and a controller configured to control operation of the shifting structure and the hydrostatic continuously variable transmission, wherein the controller is configured to operate the hydrostatic continuously variable transmission to cause rotation of the transmission member to cause nudging of the transmission member in a first direction, and then nudging of the transmission member in a second, opposite direction, and wherein the controller is configured to allow the shifting structure to shift the gear apparatus from the first gear position to the second gear position while the transmission member is rotating at, or converging with, the first speed.

13. The transmission arrangement of claim 12, wherein the hydrostatic continuously variable transmission is configured to rotate the transmission member at an intermediate speed, and wherein the controller is configured to operate the hydrostatic continuously variable transmission to cause rotation of the transmission member at the intermediate speed, and then at the first speed.

14. The transmission arrangement of claim 12, wherein the hydrostatic continuously variable transmission is configured to rotate the transmission member in a first direction and in a second, opposite direction.

15. The transmission arrangement of claim 12, wherein the hydrostatic continuously variable transmission is configured to rotate the transmission member at an intermediate speed, and wherein the controller is configured to operate the hydrostatic continuously variable transmission to cause rotation of the transmission member at the intermediate speed, and then at the first speed, and wherein the hydrostatic continuously variable transmission is configured to rotate the transmission member in a first direction and in a second, opposite direction.

16. A vehicle, comprising:
   ground engaging members;
   a transmission member including an output connected to the ground engaging members; and
   a transmission arrangement including at least a first gear position and a second gear position, the transmission arrangement including:
      a transmission member;
      a gear apparatus coupled to the transmission member and configured to be shiftable between at least the first gear position and the second gear position;
      shifting structure operable to shift the gear apparatus between at least the first gear position and the second gear position;
      a hydrostatic continuously variable transmission capable of rotating the transmission member at a first speed; and
      a controller configured to control operation of the shifting structure and the hydrostatic continuously variable transmission,
      wherein the controller is configured to operate the hydrostatic continuously variable transmission to cause rotation of the transmission member to cause nudging of the transmission member in a first direction, and then nudging of the transmission member in a second, opposite direction, and
      wherein the controller is configured to allow the shifting structure to shift the gear apparatus from the first gear position to the second gear position while the transmission member is rotating at, or converging with, the first speed.

17. The vehicle of claim 16, wherein the hydrostatic continuously variable transmission is configured to rotate the transmission member at an intermediate speed, and wherein the controller is configured to operate the hydrostatic continuously variable transmission to cause rotation of the transmission member at the intermediate speed, and then at the first speed.

18. The vehicle of claim 16, wherein the hydrostatic continuously variable transmission is configured to rotate the transmission member in a first direction and in a second, opposite direction.

19. The vehicle of claim 16, wherein the hydrostatic continuously variable transmission is configured to rotate the transmission member at an intermediate speed, and wherein the controller is configured to operate the hydrostatic continuously variable transmission to cause rotation of the transmission member at the intermediate speed, and then at the first speed, and wherein the hydrostatic continuously variable transmission is configured to rotate the transmission member in a first direction and in a second, opposite direction.

* * * * *

UNITED STATES PATENT AND TRADEMARK OFFICE
CERTIFICATE OF CORRECTION

PATENT NO.      : 8,185,280 B2                     Page 1 of 1
APPLICATION NO. : 12/003004
DATED           : May 22, 2012
INVENTOR(S)     : Evans et al.

It is certified that error appears in the above-identified patent and that said Letters Patent is hereby corrected as shown below:

In the Specification,

Column 4, line 30, delete "Industrial Applicability" and insert -- INDUSTRIAL APPLICABILITY --.

Signed and Sealed this
Eighteenth Day of August, 2015

Michelle K. Lee
*Director of the United States Patent and Trademark Office*